United States Patent [19]

Kojicic

[11] Patent Number: 4,526,230

[45] Date of Patent: Jul. 2, 1985

[54] DOUBLE WALLED SCREEN-FILTER WITH PERFORATED JOINTS

[75] Inventor: Bozidar Kojicic, New York, N.Y.

[73] Assignee: Seminole Energy Tools, Inc., Houston, Tex.

[21] Appl. No.: 404,146

[22] Filed: Aug. 2, 1982

[30] Foreign Application Priority Data

Aug. 4, 1981 [YU] Yugoslavia ............... 1921/81

[51] Int. Cl.³ ............................................. E21B 43/08
[52] U.S. Cl. .................................. 166/236; 166/51; 166/56; 175/314
[58] Field of Search ............... 166/51, 56, 227, 236, 166/228, 278; 175/22, 314

[56] References Cited

U.S. PATENT DOCUMENTS

| | | | |
|---|---|---|---|
| 1,004,528 | 9/1911 | Berky | 175/314 |
| 1,839,044 | 12/1931 | Minyard | 166/228 |
| 2,978,033 | 4/1961 | Pitcher et al. | 166/236 |
| 3,965,981 | 6/1976 | D'Amiano | 166/228 |

FOREIGN PATENT DOCUMENTS 7712759 11/1977 Netherlands ............... 166/236

Primary Examiner—Stephen J. Novosad
Assistant Examiner—Mark J. DelSignore

[57] ABSTRACT

A well screen-filter includes a pair of substantially spaced concentric screens defining an annular filtering space therebetween, connected with perforated joint(s) closing the lower end of the filtrating space. The annular space is filled with filtrating materials (gravel or synthetic balls) as a pack and an upper joint acts as a cover cap of the annular filtrating space to seal the pack. The lower perforated joint includes holes for passage of fine particles to a sedimentation tube, preventing clogging of the pack and enabling proper functioning of the double walled screen-filter.

8 Claims, 9 Drawing Figures

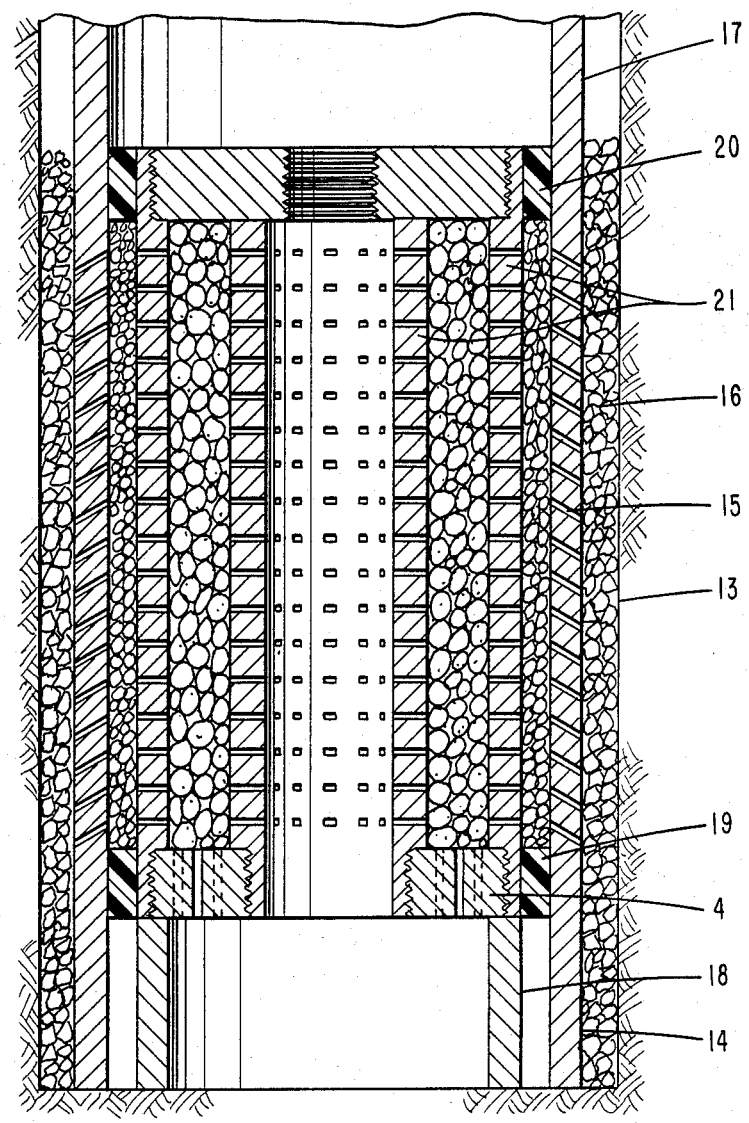

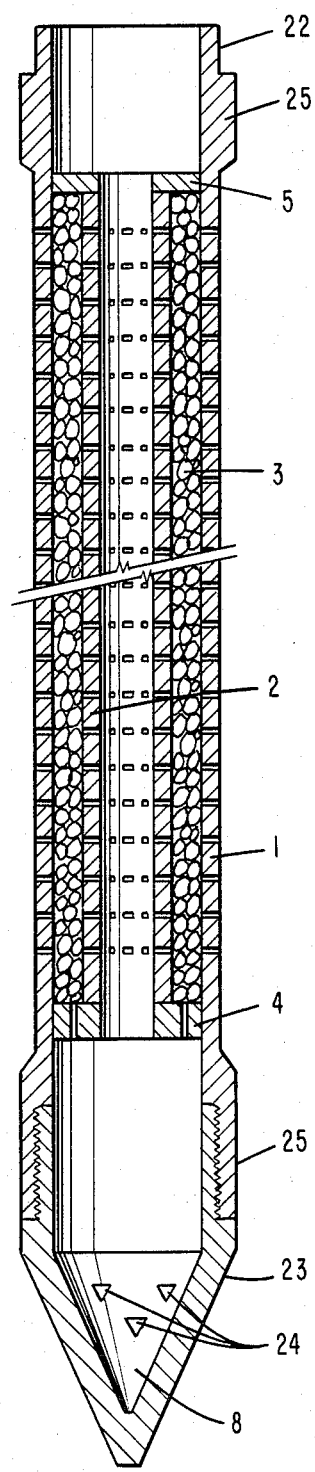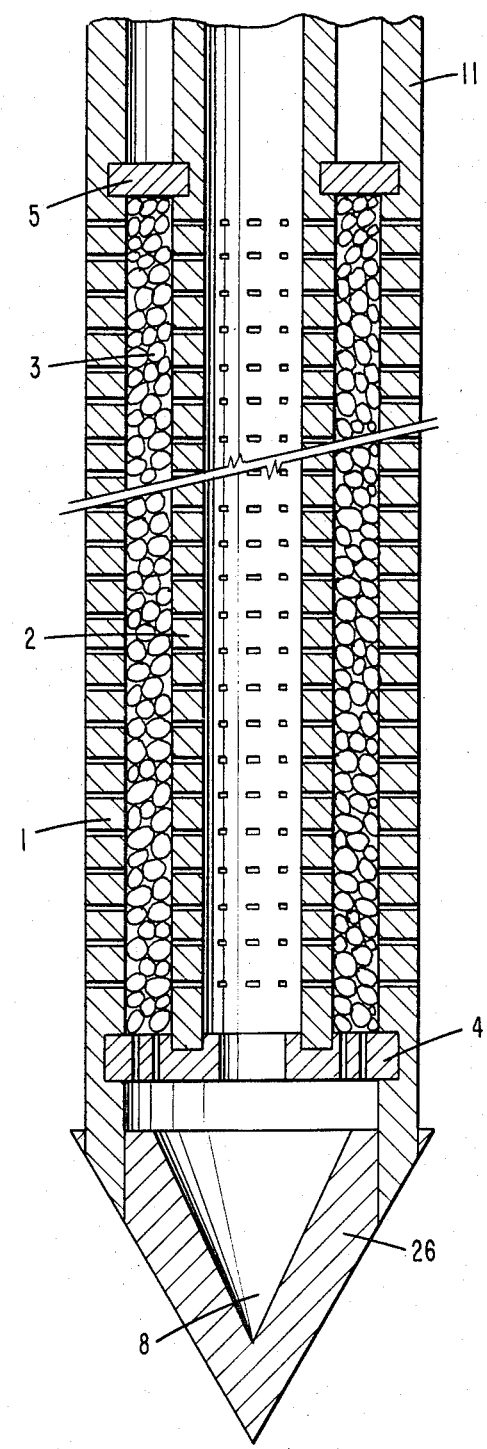

DOUBLE WALLED SCREEN-FILTER WITH PERFORATED JOINTS

TECHNICAL FIELD

The present invention relates to well strainers, screen-filters and the like, employed in equipping oil, gas and water wells to protect sanding and silting in.

BACKGROUND ART

Conventional screen-filters are used in many gas, oil and water wells to reduce sanding and silting in. These screen filters generally employ as filter material any of an artificial gravel pack poured into an annular space between the wall of the hole and the outside space of the screen, or a gravel pack formed by the formation gravel grains during development of the wells or gravel grains or grains formed of other materials, so that the filter material is applied as a bonded-on pack into the slots of the screen or bonded-on as a coated pack on the outside space of a single screen with a special type of resin.

The wells with a gravel pack in the annular space must be drilled with a large diameter to accommodate a minimum of three inch gravel pack thickness from each side and to ensure that a required envelope of gravel will surround the entire screen. But generally, even in the large diameter hole having an adequate annular space, gravel is improperly packed. Therefore, this approach is costly and not effective to prevent sanding and silting in, particularly for deeper wells.

The pack formed by development from formation gravel grains, also requires a large hole diameter and a very strong and special type of screen for long lasting development and very often fails to be fully satisfactory. Therefore, this approach is more costly and is not effective for protection of sanding and silting in.

A pack bonded-on the outside or bonded-on into the screen openings from the gravel grains or grains from the other materials is very costly, fragile and very sensitive to transportation and installation into the hole.

Such tightly packed grains reduce by about three times the free flow areas, compared with that of a loosely packed grains.

Fine sand and silt entering any of these gravel or other packs will drastically reduce porosity and permeability of the filtering system. When fine particles occupy openings between the coarser particles of the artificial gravel pack, i.e., when porosity and permeability are reduced, the velocity of the fluid flowing through the screen-filter will be drastically increased, causing abrasion and incrustation of the screen, reduction of the yield, with increased possibility to the collapse of the screen or casing.

Cleaning and maintenance of such well screen-filters are very costly and hazardous. Therefore, the key to good well efficiency is effective screen-filter operation which depends in turn upon the screen design.

DISCLOSURE OF INVENTION

The present invention provides a well screen-filter having substantially concentric and cylindrical, perforated or punched or slotted or wrapped screen members positioned to define an annular filtrating space therebetween. The double walled screen filter has a lower perforated joint-ring connected to the lower ends of the screen members and supporting filter material in the annulus between the two screens and below an upper cap. The double walled screen-filter is capable of being installed in a hole of a diameter just slightly larger than the outer diameter of the screen-filter. This is important because a larger diameter hole substantially increases drilling costs without significantly improving water yield.

The inner and outer screen members can be made of different materials, as for example, different types of polymer (PVC or other), fiber glass, carbon steel, stainless steel or alloy.

The outer screen is made of a stronger material than the inner screen because the outer screen is exposed to all pressure and tension whereas the inner supports only the filter material.

The inner and outer screens may be manufactured from pipes or metal sheets, by perforation, punching or slotting or formed from metal bars and wires wrapped around the bars. The collapse strength of the double walled screen is increased over that of a single screen filter by the two jointed screens and therefore the total open area of both outer and inner screens can be maximized to increase the screen transmitting capacity of the double walled screen filter.

Manufacturing the inner and outer screen from noncorrosive and inexpensive plastic materials, such as PVC, with high total open area, i.e., with a high transmitting capacity, according to the invention, represents a substantial improvement in both the design of the screen and economy.

The transmitting capacity is the most important property of any screen and depends upon the total open area per foot (or per meter) of the screen, i.e., of the total open area per total length of the screen, quality of the screen and the hydraulic properties of aquifer and filtrating materials such as a gravel or polymer balls pack. The maximum transmitting capacity of the screen is expressed as gallons per minute per foot, or liters per minute per meter, at an entrance velocity of 0.1 ft/sec or 0.03 m/sec (laminar flow), and therefore can be easily calculated from the total open area of the screen by multiplying the number of square inches of open area per foot by a factor of 0.31. Thus, for the inner and outer screens, total open area (over 10 percent or more) can be very easily adjusted, even for small diameter of outer and inner screens, in order to obtain the maximum transmitting capacity.

Thus, according to the invention, the total length and diameter of the double walled screen-filter can be considerably reduced, because of the possibility of obtaining the same quantity of fluid as for a larger filter under favorable hydraulic conditions. This represents reduced cost for the screen-filter, as compared to any other existing type of screen-filter, an important issue since the construction of the screen-filter is always the most expensive component of any well construction.

Vertically perforated lower joints and upper solid cover cap can also be made from the same or different materials as the inner and outer screen members. The vertically perforated lower joint is used to join the inner and outer screen and to support the gravel or polymer balls pack material. The lower joint also enables proper development of the well and transfers fine particulate material into a sedimentation tube (sand trap), as the material flows from the acquifer through the outer screen to the gravel or polymer balls pack.

The strength of the vertically perforated lower joint depends on the materials to be made, the length and diameter of the screen segment, the annular space between two screens (inner and outer), the type of pack materials, i.e., its total weight, depth and other conditions of the well.

The vertically perforated lower joint can be attached to the screens by inside and outside threads, or by outside threads only, by welding or by cementing (for screen members made of PVC materials), or by other means.

The vertically perforated lower joint, even with threads, can be incorporated very easily between the threads of ordinary threaded pipes and the screen threads, without any changes of the threads of the joint system on existing pipes and screens.

Vertical openings on the lower perforated joints comprise numerous holes. The size of the holes on the vertically perforated lower joints is the same as that of the slot openings of the outer screen, and the number depends upon the quality of the materials and space, although it is preferable to have as many as possible.

The filtering materials, gravel or polymer balls pack, must be uniformly filled in the annular space between inner and outer screen members. The grannular size of the material depends upon aquifer conditions (determined on the base of sieve analyses of the aquifer grain sizes), and must be bigger than the slot sizes of the screen members. The filtering materials (gravel or polymer balls pack) may be filled on the spot into the annular space between the screens during installation of the double walled screen, with the grain sizes as required by the bearing formation, thus making it possible to also fill in segment filtrating materials of different size in accordance to the changes of the granulation of the bearing formation column.

For example, the lowest part can be filled up with largest size of the gravel or polymer balls, and above this column pack, smaller grain sizes can be filled up, or vice versa.

Such loose filtrating materials (gravel or polymer balls), particularly when they are well rounded grains and uniform, will possess more than double the free flow area or transmitting capacity of any densely packed filtrating material or almost three times the free flow area or transmitting capacity than a bonded-on screen of gravel or polymer balls granules. Laboratory and field tests prove that the thickness of the filtrating materials (gravel or polymer ball pack) filled up into the annular space between inner and outer screens could be very modest, i.e., about 1" (25.4 mm) and successfully retains the finest formation particles regardless of the velocity of fluid tending to carry these fine particles through filtrating materials.

The upper joint, or solid cover cap on the top of the double walled screen-filter, is used only to seal filtrating materials in the annular filtrating space. It can be made from the same materials as the other members of the double walled screen, and connected only with threads or by welding or by cementing or by other means to the inner screen.

Several field tests performed in water wells with double walled screen-filter (with gravel pack as filtrating materials), but without lower perforated joints did not give satisfactory results, either during well development or during pumping water, because of clogging by filtrating materials carrying particles from the water bearing formation. These lower perforated joints further enable proper cleaning and development of the bearing formation and cleaning of filtrating materials (gravel or polymer ball pack) from the fine particles entering the filtrating materials from the bearing formation during development of the well. In addition, the holes of the lower perforated joint make possible easy and free passage of the finest particles into a sedimentation part of the well (sedimentation pipe or sand trap) during pumping or lifting of fluids, thereby maintaining the effectiveness of the filtrating material for reliable double screen-filter operation.

Such double walled screen-filter with perforated lower joint, filtrating material and upper cover cap, according to the invention, can be constructed on the spot, during installation into the borehole, representing a considerable savings with respect to transport expenses, installation and maintenance.

The construction of the screen-filter of the invention also fully satisfies all technical requirements related to mechanical strength, as for example: resistance to pressure, tension and stress during installation into borehole, including resistance to denting from the effect of inside and outside pressure caused by formation conditions or by pressure and flow from the aquifer through the screen-filter segments; or by differential pressure into the well of any case.

When the screen members of the double walled screen-filter are made of polymer materials, they are fully resistant to corrosion and destruction by bacteria and considerably resistant to incrustation.

The members of the double walled screen-filter with lower perforated joints to be installed in the deep wells, according to the invention, can be constructed from different materials. For example, the outside screen and lower perforated joint (particularly when the double walled screen is composed from only one segment) may be made from metal materials of a corresponding strength (preferably non-corrosive) as that of the sedimentation pipe and protective casing; the inner screen and upper cover caps may be made from polymer material (such as PVC). Such inner screen and upper cover cap, made of polymer material, can be easily destroyed if necessary (after inproperly functioning) and replaced together with filtrating material without any damage to the metal outside screen and lower perforated joint or other parts of the well construction.

The members of the double walled screen-filter and filtrating material (either from gravel or polymer ball pack) made from polymer can also be very easily destroyed and replaced when it is installed into a telescopic type of well and particularly when the upper part of the well is cased with a metal casing.

Another very important aspect of the invention is mixing concentrated dry chlorine pellets with filtrating materials to disinfect the well, chlorinate the water, destroy iron bacteria and inhibit incrustation.

This further contributes essentially to a prolongation of the life expectancy of the screen-filter and well, and improves performance of the well.

It is therefore an object of the invention to provide a well strainer, i.e., screen-filter, so constructed as to enable proper well development, highest transmitting capacity under laminar flow condition, eliminatimg sanding and silting in, either by pressure flow or pumping conditions.

Further benefits, features and aspects of the invention will be apparent from the following description of the drawings.

BRIEF DESCRIPTION OF DRAWINGS

FIG. 7 is a longitudinal cross-sectional view of the double walled screen-filter with joints in an existing wall;

FIGS. 8a, b are longitudinal cross-sectional views of the double walled screen-filter in the well point and in the small diameter hole.

BEST MODE FOR CARRYING OUT THE INVENTION

Referring to FIGS. 1 to 4, the numeral 1 represents an outer screen having a slot opening; 2 represents an inner screen having slot openings; 3 is a loosely packed filtrating material (gravel or polymer balls pack); 4 a lower perforated joint; 5 an upper joint cover cap; 6 are slots (holes); 7 are threads of joints; A is free space between upper part of the screen threads and upper part of sedimentation tube when lower perforated joint is incorporated into existing threads between screen and sedimentation pipe; and B is same as A, but for upper joint 5 and between screen and pipe.

Referring to FIGS. 5 to 8, the numeral 8 represents a sedimentation tube, or cone (sand trap); 9 is a bottom cap of the well construction with threads or other connection on the side; 10 is a hole with left hand threads in the middle of bottom cap; 11 represents a protective pipe-casing above the double walled screen-filters; 12 is a cement ring (seal); J is an upper part of the double walled screen-filter construction for installation into the hole by hook; 13 is the hole; 14 is a previously installed sedimentation tube; 15 is a previously installed screen; 16 is a previously installed or formed gravel pack; 17 is a previously installed protection pipe-casing; 18 is a new sedimentation tube; 19 is a lower packer; 20 is an upper packer; 21 is a newly installed double walled screen-filter construction; 22 are driven pipes; 23 is a drive cone for well point; 24 is a jetting nozzle; 25 is a threaded joint; and, 26 is a spire.

Figure 1:
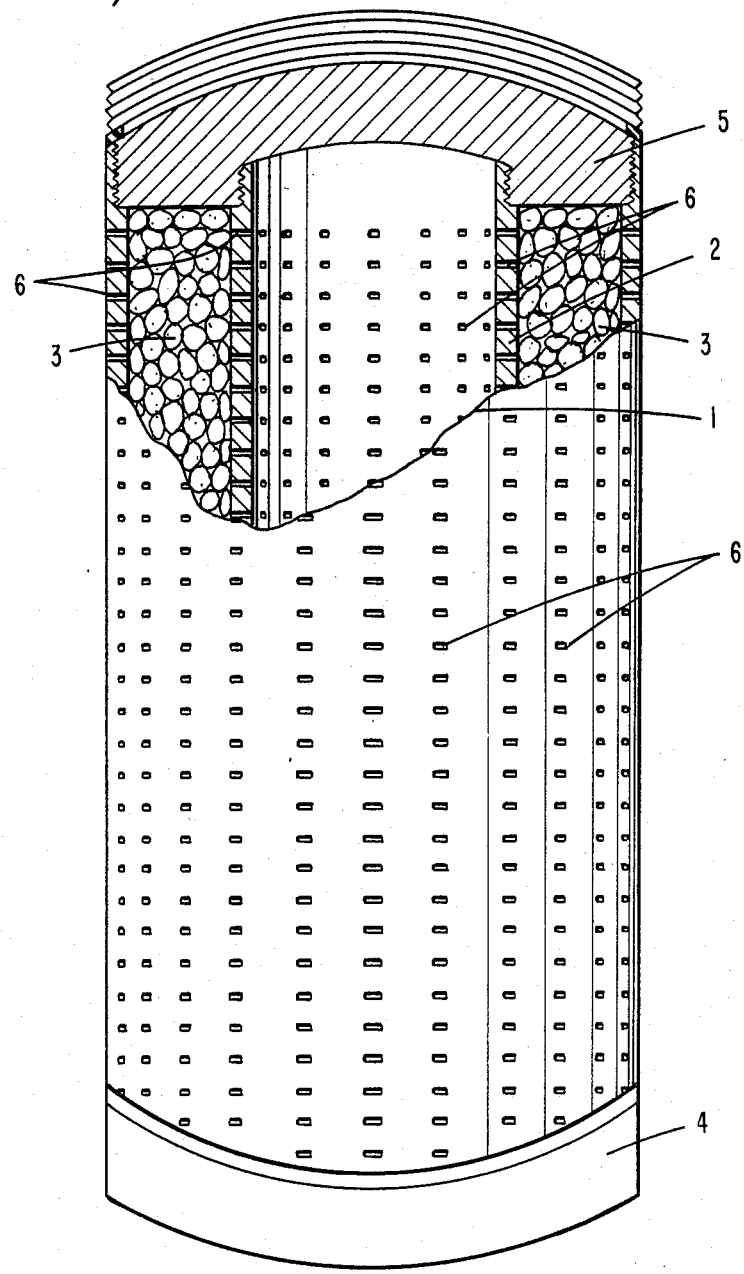
FIG. 1 is a general view of the double walled screen-filter segment according to the invention.
Figure 2:
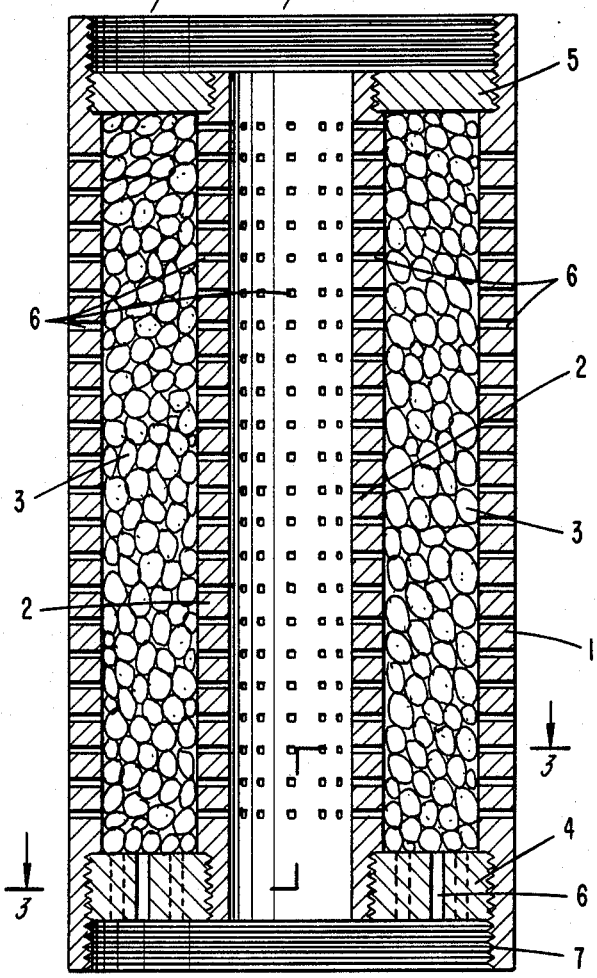
FIG. 2 is a longitudinal cross-sectional view of the double walled screen-filter in accordance with one embodiment of invention.
Figure 4:
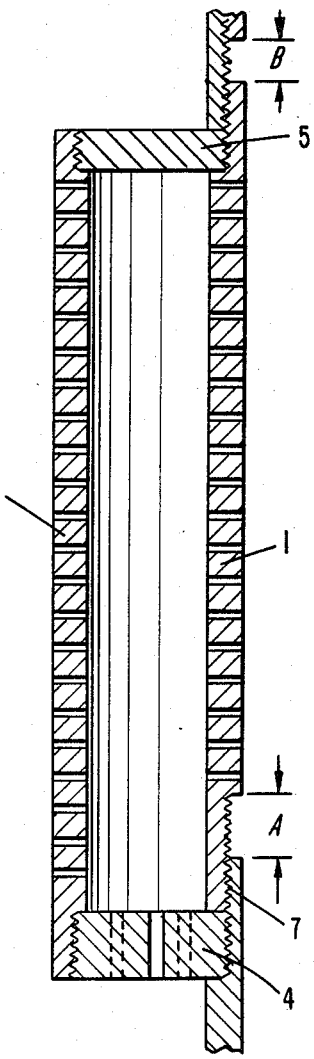
FIG. 4 is a partial longitudinal cross-sectional view of double walled screen members.
Figure 3:
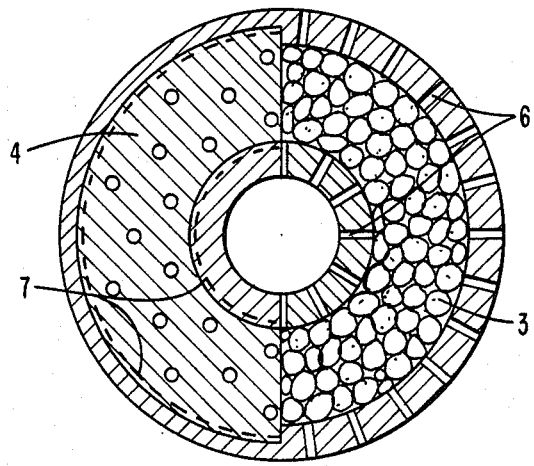
FIG. 3 is a sectional view taken through the line a—a of FIG. 2.

The embodiment, as illustrated in FIG. 4, shows that the lower perforated joint(s) is threaded outside and inside and incorporated into existing threads of a screen-pipe in order to couple together the inner and outer screens, although it can be threaded on only the outside for connection with the outer screen, on the inside for connection with the inner screen to be adjusted accordingly so that the lower perforated joint will serve as a supporter only of the inner screen, or both sides of the lower perforated joint(s) to be connected with the inner and outer screens by welding or cementing, as already explained. The upper joint-ring or cover cap, shown in FIG. 4 is threaded only on the outside. The cap can also be connected to the inner and outer screens by welding or cementing, or by other means.

Figure 5:
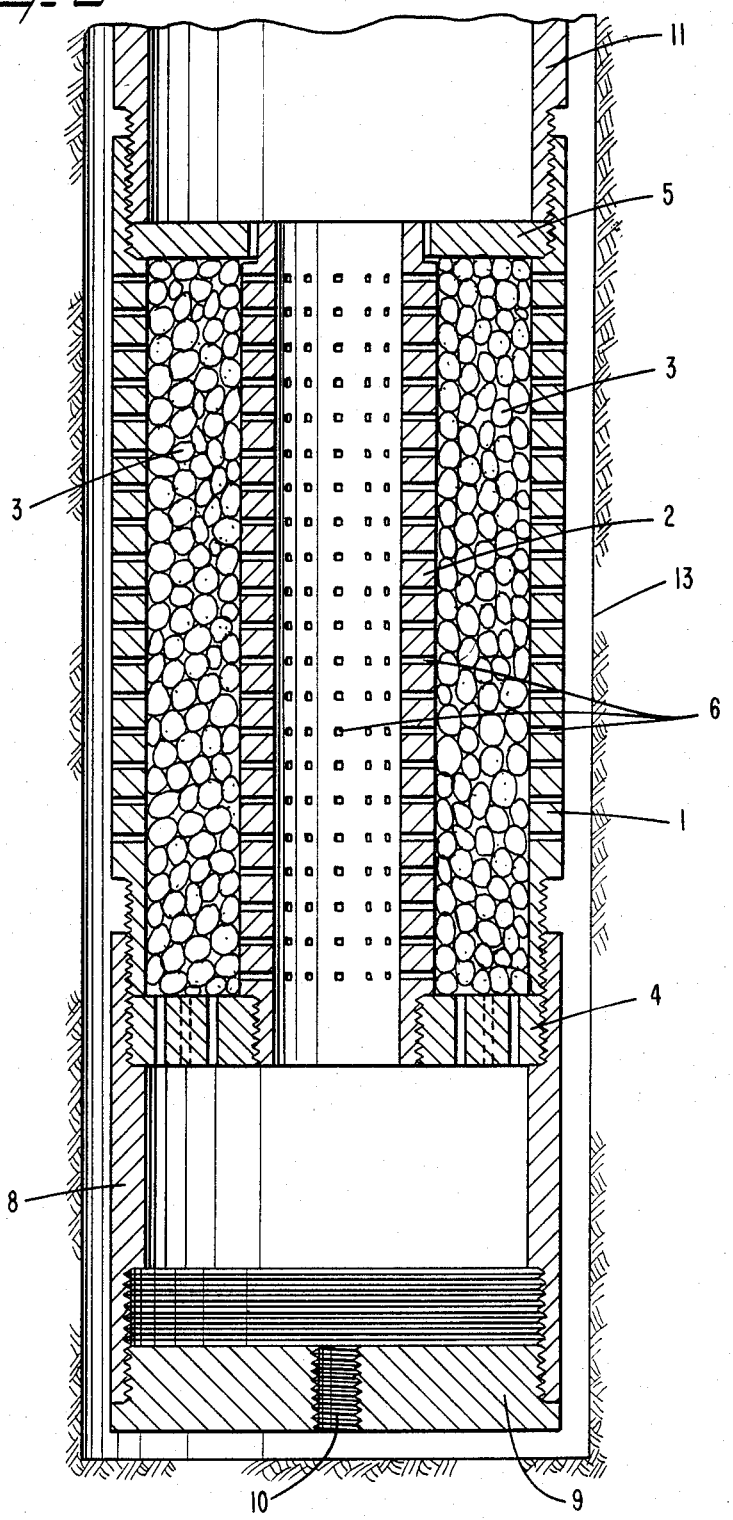
FIG. 5 is a longitudinal cross-sectional view of the double walled screen-filter with joints in a straight type of well construction.

The embodiment, as illustrated in FIG. 5, shows the double walled screen-filter construction directly connected with a protective pipe-casing, in a so-called straight well construction. The bottom cap with a hole in the middle having left hand threads is connected to a sedimentation tube 8. The purpose of such bottom cap construction is generally for the installation of the whole well construction and well development with direct circulation.

Installation of the whole well construction (or only screen-filter construction in case of a telescopic type of well), is performed through the pipe with left hand threads connected to the bottom cap before final setting down of the well construction using any corresponding fluid, so that the double walled screen and the walls of the well, particularly in the bearing formation, are properly washed. Later on, when the whole well construction is properly lowered down at the borehole bottom, and left hand pipes unscrewed from the bottom cap, washing may also be performed inside, in order to ensure proper cleaning of the double walled screen-filter construction.

Figure 6:
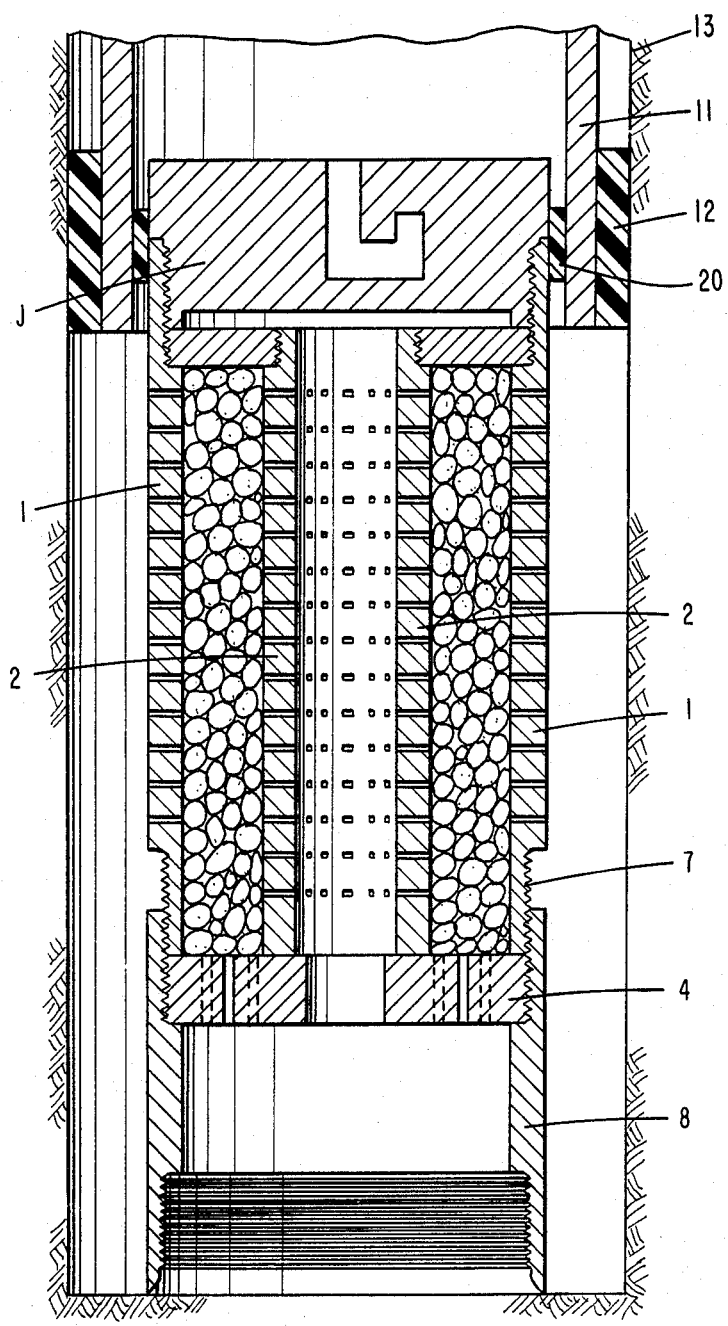
FIG. 6 is a longitudinal cross-sectional view of the double walled screen-filter with joints in a telescopic type of well construction.

FIG. 6 shows a telescopic type of well construction with installed double walled screen-filter in the lower part of a borehole with a hook and a pipe. The upper part of the double walled screen-filter construction is sealed with rubber packers 20 to prevent entrance of formation materials into the well through the annular space of the protective pipe-casing 11 and outside of the upper part of the double walled screen-filter construction. Therefore, when the double walled screen-filter construction is made of polymer materials (such as PVC or similar) and installed into a cased borehole, particularly with metal pipe-casing (as upper part of the well construction), the filter may be easily demolished should any problems occur during or after installation and will, at the same time, preserve the water well from any damage. The lower part of the borehole need only be recleaned and a new double walled screen-filter construction system installed again.

FIG. 7 shows how the double walled screen-filter construction may be installed in an existing well when sanding up represents a serious problem to either the production or wearing out of the well pump. The double walled screen-filter is installed inside the existing well screen with two packers 19 and 20. The lower 19 and upper 20 packers seal the annular space between the existing pipe-casing (sedimentation tube and protective pipe-casing) and the double walled screen-filter construction. Redevelopment of the well and cleaning of the double walled screen-filter may be performed easily through the lower perforated joint(s), with any corresponding fluid.

FIGS. 8a, b shows how the double walled screen-filter is used in well point or in a small diameter hole. Therefore, for a well point, i.e., for driven wells, either the inner or outer screen can be made of perforated or slotted or punched steel tube of similar construction of different diameter, attached to the well point cone (which is used also as a driving tool and thereafter as a sand trap) and to a driving pipe on the top, and constructed with other screen-filter members as any other double walled screen-filter.

For a drive well point according to the invention, as shown in FIG. 8a, an outer screen of 2½" (63.5 mm) and inner screen of 1" (25.4 mm) nominal diameters, with a threaded joint of an approximately 3" (76.2 mm) outside diameter and a drive cone with jetting nozzles on the cone and different slot sizes (0.1-2 mm or over 2 mm) on the screens and proper granulus of the filtering materials (gravel or polymer loose balls pack) will prevent any sanding and silting in.

Similar construction of the double walled screen-filter but with spire as shown in FIG. 8b can be used for a small diameter hole of any kind.

The advantages of the double walled screen-filter construction are summarized as follows:

(1) Production of fluids free of sand and silt from the wells under favorable hydraulic conditions;

(2) Economy with regard to the drilling cost of wells; selection of the materials and manufacturing of the screen-filter; transportation, installation and maintenance of the screen filter; prolongation of the life of the screen-filter and the complete well construction; prolongation of the life expectancy of the pumping units and water distribution system;

(3) Reduction of the screen length and diameter due to the possiblity of obtaining a high total open area and the optimum hydraulic characteristics of the screen-filter; reduction to the construction weight of the screen and resistance to corrosion and bacteria destruction, when using polymer materials;

(4) Easy well development and maintenance of the double walled screen construction during production;

(5) The possibility of replacing the entire lower part of the well construction (double walled screen-filter) when manufactured from polymer materials;

(6) Using faster, more effective and cheaper well disinfection, water chlorination, and protection of well construction against bacteria and incrustation;

(7) The possibility of manufacturing the same type of double walled screen-filter construction from considerably more resistant materials and under reasonable cost and using it in deep oil, gas or geothermal wells, where it is necessary to prevent sanding up.

In this disclosure, there is shown and described only the preferred embodiments of the invention, but as aforementioned, it is to be understood that the invention is capable of use in various other combinations and environments and is capable of changes or modifications within the scope of the invention concept as expressed herein.

I claim:

1. A double wall screen filter adapted to be installed in a hole formed in fluid bearing formations and to prevent sanding and silting-in during production, comprising:
   (a) a pair of spaced, substantially concentric and cylindrical perforated screen members positioned to define an annular filter space therebetween;
   (b) filter means substantially filling the annular filter space for filtering particulate materials from fluid flowing through it, the particulate materials having a tendency to pass into a well;
   (c) upper joint means for sealing the upper end of said annular filtering space above the filtering means; and
   (d) lower joint means for connecting together lower end portions of said screen members and supporting said filter means, the lower joint means including an annular ring extending between the lower portions to join the inner and outer screen members together and said annular ring having passages for enabling passage of the particulate materials in the filter space to a sedimentation area of the hole below the filter.

2. The filter of claim 1, wherein corresponding perforations in the inner and outer screen members extend respectively within a common plane.

3. The filter of claim 1, wherein said filtering means includes loosely packed polymer spheres forming a filtering pack material.

4. The filter according to claim 3, wherein said inner and outer screen members are formed from polymer material.

5. The filter of claim 1, further including a well point downwardly depending from and attached to the filter, said well point including a sand trap formed internally within the well point and in communication with the passages in the lower joint means.

6. The filter of any one of claims 1-5, wherein said filter means includes concentrated dry chlorine pellets.

7. The filter of claim 1, wherein said filtering means includes loosely packed gravel spheres forming a filtering pack material.

8. The filter of claim 1, wherein said passages in the annular ring and the perforations in the outer screen define openings generally of equal diameter.

* * * * *

UNITED STATES PATENT AND TRADEMARK OFFICE
CERTIFICATE OF CORRECTION

PATENT NO. : 4,526,230

DATED : July 2, 1985

INVENTOR(S) : Bozidar KOJICIC

It is certified that error appears in the above-identified patent and that said Letters Patent is hereby corrected as shown below:

On the title page;

Delete "[73] Assignee:   Seminole Energy Tools, Inc., Houston, Tex."

Signed and Sealed this

Twenty-second Day of October 1985

[SEAL]

*Attest:*

*Attesting Officer*

DONALD J. QUIGG

*Commissioner of Patents and Trademarks—Designate*